(12) United States Patent
Challapali et al.

(10) Patent No.: US 6,298,090 B1
(45) Date of Patent: Oct. 2, 2001

(54) SYSTEM FOR DETECTING REDUNDANT IMAGES IN A VIDEO SEQUENCE BY COMPARING TWO PREDETERMINED THRESHOLD VALUES

(75) Inventors: Kiran Challapali, Stamford, CT (US); Yingwei Chen, Ossining, NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/090,594

(22) Filed: Jun. 4, 1998

(51) Int. Cl.$^7$ ..................................................... H04N 7/18
(52) U.S. Cl. ................................ 375/240.29; 375/240.26
(58) Field of Search ................................. 348/96, 97, 98, 348/699, 701, 700; 382/236, 232; 375/240.29, 240.26

(56) References Cited

U.S. PATENT DOCUMENTS

| 5,406,333 | 4/1995 | Martin | 348/449 |
|---|---|---|---|
| 5,426,464 | 6/1995 | Casavant et al. | 348/415 |
| 5,452,011 | 9/1995 | Martin et al. | 348/526 |
| 5,491,516 | 2/1996 | Casavant et al. | 348/415 |
| 5,911,008 | * 6/1999 | Niikura et al. | 382/236 |
| 6,037,986 | * 3/2000 | Zhang et al. | 348/409 |
| 6,041,142 | * 3/2000 | Rao et al. | 382/232 |

OTHER PUBLICATIONS

PHA 23,363, U.S. application No. 09/016,038, filed Jan. 30, 1998.

* cited by examiner

Primary Examiner—Andy Rao
(74) Attorney, Agent, or Firm—Russell Gross (57) ABSTRACT

A system for detecting redundant images in a video sequence includes dividing a target image in the video sequence into a plurality of regions, and determining, for each of the plurality of regions, a local value comprising a sum of differences between individual pixels of each region and corresponding pixels in at least one other image in the video sequence. The local value for each of the plurality of regions is then compared to a first predetermined threshold. The system also includes determining a global value comprising a sum of differences between substantially all pixels in the target image and corresponding pixels in the at least one other image, and comparing the global value to a second predetermined threshold. An indication that the target image is redundant is then output in a case that the local value does not exceed the first predetermined threshold for all regions, and the global value does not exceed the second predetermined threshold.

23 Claims, 5 Drawing Sheets

SYSTEM FOR DETECTING REDUNDANT IMAGES IN A VIDEO SEQUENCE BY COMPARING TWO PREDETERMINED THRESHOLD VALUES

The invention described herein was developed pursuant to United States Government Contract No. 70NINB5H1174, which was awarded by the National Institute For Standards And Technology ("NIST").

BACKGROUND OF THE INVENTION

1. Field of the Invention

The present invention is directed to a system which detects redundant images in a video sequence. In particular, the invention is directed to a system which determines whether a target image in the video sequence is a redundant image by comparing two predetermined threshold values to sums of differences between pixels in the target image and corresponding pixels in at least one other image in the video sequence.

2. Description of the Related Art

Telecines are well known devices that are used to generate video data from film images. These devices are commonly used in the television industry to convert motion pictures into video sequences for display on television. Problems arise from this conversion process, however, due to inherent differences between film and video.

More specifically, film sequences, such as motion pictures, have a frame rate of 24 frames-per-second. In contrast, video sequences have frame rates which are higher than 24 frames-per-second. For example, video sequences comprised of interlaced video images, i.e., video images in which two different fields are interlaced in one frame, have a frame rate of 30 frames-per-second. Video sequences comprised of progressive video images, on the other hand, have an even higher frame rate of 60 frames-per-second. In order to compensate for these different frame rates, and still maintain correspondence between the film sequence and the video sequence, telecine devices introduce additional, redundant images (i.e., fields and/or frames) into the video sequence. These redundant images essentially comprise repeats of earlier images of the video sequence, which are inserted at appropriate points in the video sequence.

Early on, it was recognized that there is no need to code these redundant images, since such images could merely be recreated at a decoder by copying other images of the video sequence. Accordingly, it became standard practice to include, in an encoder, circuitry for detecting redundant images. Conventional circuitry of this type determines redundancy by comparing pixels in an entire field and/or frame of a video sequence to corresponding pixels in another field and/or frame of a video sequence (see, e.g., U.S. Pat. Nos. 5,452,011, 5,406,333, 5,491,516, and 5,426,464). Specifically, conventional circuitry compares sums of differences in the foregoing pixels to a threshold value and, based on this comparison, ascertains whether the content of a target image is the same as the content of another image in the video sequence, usually an immediately preceding image.

To account for noise introduced by a telecine device, redundancy detection circuitry of the type described above sets its threshold high for high-noise telecine devices and low for low-noise telecine devices. However, using the same threshold to account for both variations in image content and telecine noise can lead to errors, particularly in cases where only small localized regions of two images vary in content. That is, in such cases, conventional circuitry often interprets these variations in content as telecine noise, thereby leading to an erroneous redundancy determination.

Thus, there exists a need for a redundant image detection circuit, for use in an encoding system or the like, which is able accurately to detect both telecine noise and variations in image content.

SUMMARY OF THE INVENTION

The present invention addresses the foregoing need by providing an apparatus which detects redundant images in a video sequence. In particular, the invention determines whether a target image in the video sequence is a redundant image by comparing two threshold values to sums of differences between pixels in the target image and corresponding pixels in at least one other image in the video sequence. Preferably, a first of the threshold values is set based on differences in content between the target image and the at least one other image, and a second of the threshold values is set based on noise introduced into the video sequence by a telecine device used to generate the video sequence. As a result, the invention is able to detect both telecine noise and variations in image content more accurately than it; conventional counterparts described above.

Thus, according to one aspect, the present invention is an apparatus which detects redundant images in a video sequence. The apparatus includes a processor and a memory which stores computer executable process steps. The processor executes the process steps stored in the memory so as (i) to divide a target image in the video sequence into a plurality of regions, (ii) to determine, for each of the plurality of regions, a local value comprising a sum of differences between individual pixels of each region and corresponding pixels in at least one other image in the video sequence, (iii) to compare the local value for each of the plurality of regions to a first predetermined threshold, (iv) to determine a global value comprising a sum of differences between substantially all pixels in the target image and corresponding pixels in the at least one other image, (v) to compare the global value to a second predetermined threshold, and (vi) to indicate that the target image is redundant in a case that both (a) the local value does not exceed the first predetermined threshold for all regions, and (b) the global value does riot exceed the second predetermined threshold.

In preferred embodiments of the invention, the processor further determines a "type" of video image comprising the video sequence and selects the at least one other image in accordance with the determined type of the video image. For example, in a case that the processor determines that the type of the video image is 30 frames-per-second interlaced video, the processor selects a field of the video sequence that immediately precedes the target image. On the other hand, in a case that the type of the video image is 60 frames-per-second progressive video, the processor selects two frames of the video sequence that immediately precede the target image. By virtue of this feature, the invention can be used to detect redundant images in different types of video and, in some types of video, more than one redundant image.

According to another aspect, the present invention is a method of detecting redundant images in a video sequence. The method includes dividing a target image in the video sequence into a plurality of regions, and determining, for each of the plurality of regions, a local value comprising a sum of differences between individual pixels of each region and corresponding pixels in at least one other image in the video sequence. The method also includes comparing the local value for each of the plurality of regions to a first predetermined threshold, and determining a global value comprising a sum of differences between substantially all pixels in the target image and corresponding pixels in the at least one other image. The global value is then compared to a second predetermined threshold, and an indication is output that the target image is redundant in a case that (i) the local value does not exceed the first predetermined threshold for all regions, and (ii) the global value does not exceed the second predetermined threshold.

According to still another aspect, the present invention is an encoding device for encoding video data in a video sequence which includes a target image and at least one other image. The encoding device includes a film mode detection circuit which determines whether the target image is a redundant image by comparing two threshold values to sums of differences between pixels in the target image and corresponding pixels in the at least one other image. In the invention, a first of the threshold values is set based on differences in content between the target image and the at least one other image, and a second of the threshold values is set based on noise introduced into the video sequence by a device used to generate the video sequence. The encoding device also includes coding circuitry which codes video data for the target image in a case that the film mode detection circuit determines that the target image is not redundant.

By virtue of the foregoing features of the invention, it is possible accurately to detect telecine noise and differences in content between two images. This increase in redundant image detection accuracy increases the efficiency of the encoder, since it means that the encoder will spend less bits coding redundant fields and frames.

According to still another aspect, the present invention is a system for transmitting a video sequence comprised of a target image and at least one other image. The system includes a telecine device which generates and outputs video data for the video sequence based on input film images, and an encoder which codes the video data prior to transmission. The encoder includes a film mode detection circuit which determines whether the target image is a redundant image by comparing two threshold values to sums of differences between pixels in the target image and corresponding pixels in the at least one other image. A first of the threshold values is set based on contents of the target image and the at least one other image, and a second of the threshold values is set based on the telecine device. The encoder also includes coding circuitry which codes the video data for the target image in a case that the film mode detection circuit determines that the target image is not redundant. Finally, the system includes a decoder which receives coded video data from the encoder and which decodes the video data.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
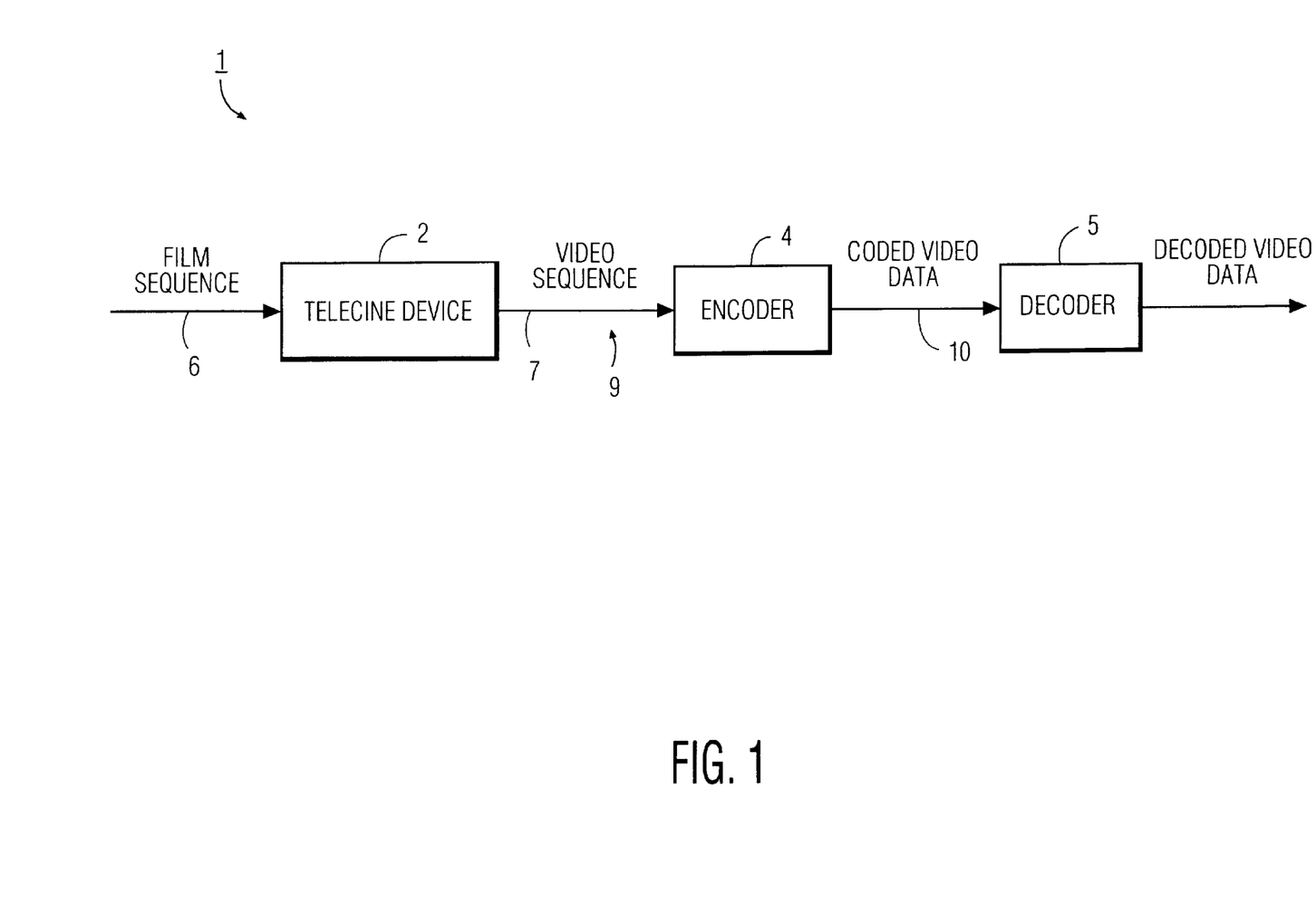
FIG. 1 is a block diagram showing a coding system in which the present invention may be implemented.

The preferred embodiment of the invention is described herein with respect to a coding system, namely coding system 1 shown in FIG. 1. As shown in FIG. 1, coding system 1 includes telecine device 2, encoder 4, decoder 5, and various transmission media over which data is transmitted. Telecine device 2 preferably has a conventional construction which is well known to those of ordinary skill in the art. In operation, telecine device 2 inputs film sequence 6, which can comprise plural film images such as a motion picture carried on 35 mm film. Telecine device 2 then converts film sequence 6 into video sequence 7, and outputs uncoded video data for video sequence 7 to encoder 4 via transmission medium 9. In this regard, transmission medium 9 can comprise a dedicated line, RF link, or a combination of the two In accordance with the invention, telecine device 2 may convert film sequence 6 into a video sequence comprised of interlaced video images having a frame rate of 30 frames-per-second. Alternatively, telecine device 2 may convert film sequence 6 into a video sequence comprised of progressive video images having a frame rate of 60 frames-per-second. In either case, in order to compensate for the difference in frame rates between film sequence 6 and video sequence 7, telecine device 2 introduces additional, redundant images (i.e., fields and/or frames) into video sequence 7. As described above, these redundant images comprise repeats of earlier images in video sequence 7, which are inserted at appropriate points therein.

Encoder 4 codes the uncoded video data received from telecine device 2, and transmits coded data to decoder 5 via transmission medium 10, which can comprise a dedicated line, RF link, or a combination of the two. In preferred embodiments of the invention, encoder 4 codes the video data using MPEG2. It should be noted, however, that other coding techniques, such as DVB or the like, may be used in place of MPEG2.

As background, MPEG2 coding is performed on an image by dividing the image into macro-blocks of 16×16 pixels, each having a separate quantizer scale value associated therewith. The macro-blocks are then divided into individual blocks of 8×8 pixels. These 8×8 pixel blocks are each subjected to a discrete cosine transform (hereinafter "DCT") which generates DCT coefficients for each of the 64 pixels therein. DCT coefficients for the 8×8 pixel blocks are then divided by a corresponding coding parameter, namely a quantization weight. Thereafter, additional calculations are effected on the DCT coefficients in order to take into account the quantizer scale value, among other things, and thereby complete MPEG2 coding.

As described in greater detail below, encoder 4 also includes a film mode detection circuit (see FIG. 2), which includes hardware and software for determining whether a target image in video sequence 7 is a redundant image. In brief, the film mode detection circuit determines whether the target image is a redundant image by comparing two threshold values to sums of differences between pixels in the target image and corresponding pixels in at least one other image in video sequence 7. A first of these threshold values is set based on differences in content (e.g., a movement of a small object) between the target image and the at least one other image in video sequence 7, and a second of these threshold values is set based on noise introduced into video sequence 7 by telecine device 2. As noted above, using such threshold values in this manner provides for more accurate redundant image detection than has heretofore been possible.

Decoder 5 can comprise any conventional decoder capable of receiving coded video data and of decoding the coded video data. As part of its operation, decoder 5 also reads flags in the coded video data, and generates redundant images (i.e., fields and/or frames) in accordance with the flags. In this regard, in a case that the film mode detection circuit detects a redundant field or frame, the film mode detection circuit adds a flag to video sequence 7 which indicates that the target image should not be coded and that decoder 5 must recreate the field or frame corresponding to the flag. This process is described in greater detail below. Following decoding by decoder 5, the decoded video data is output, e.g., to a television, video monitor, or the like.

Figure 2:
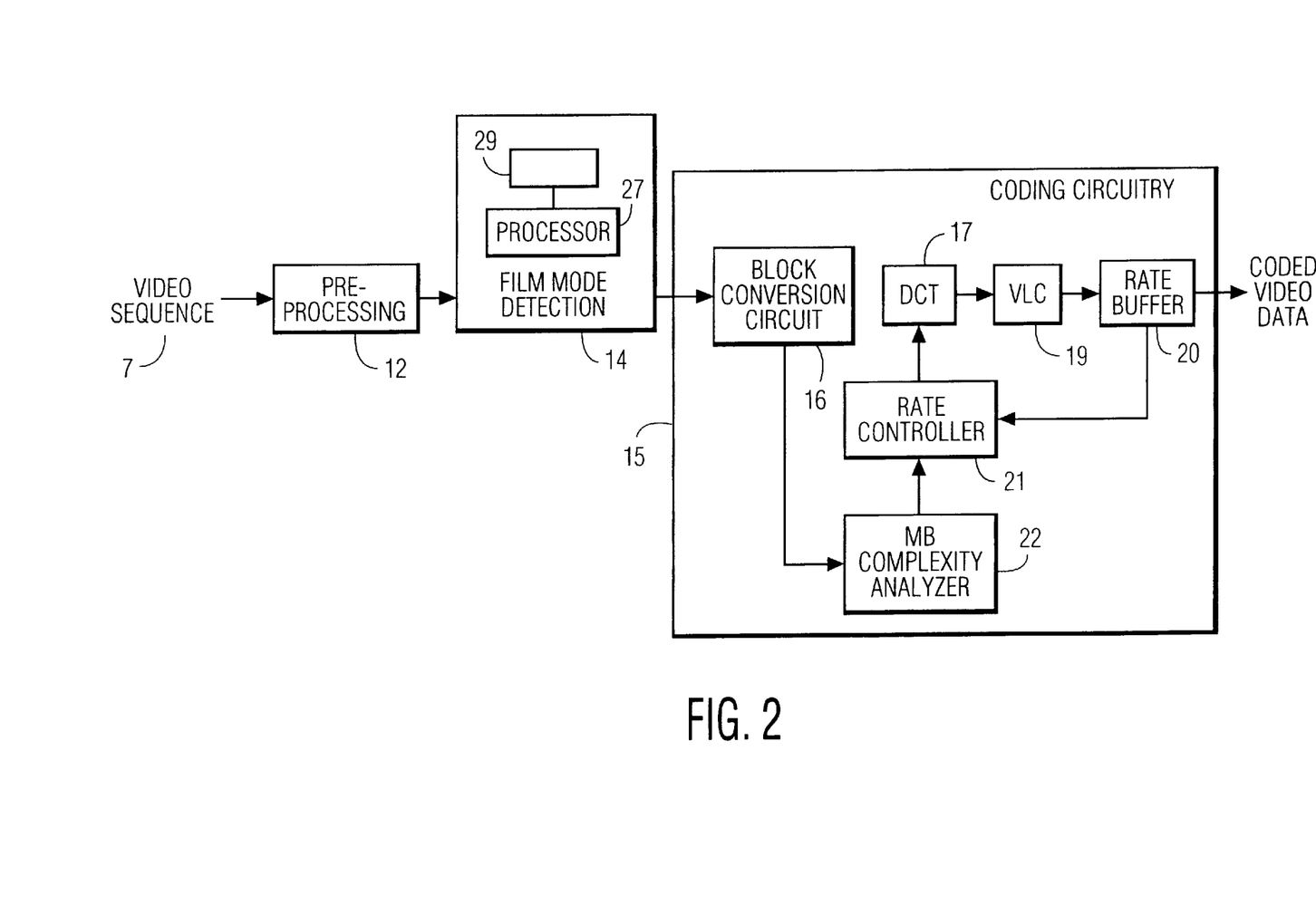
FIG. 2 is a block diagram of an encoder including a redundant image detection circuit in accordance with the present invention.

FIG. 2 is a block diagram of a preferred architecture of encoder 4 in accordance with the present invention. As shown in FIG. 2, encoder 4 includes pre-processing circuit 12, film mode detection circuit 14, and coding circuitry 15. Coding circuitry 15 includes block conversion circuit 16, DCT circuit 17, variable length coder (hereinafter "VLC") circuit 19, rate buffer 20, rate controller 21, and macroblock complexity analyzer 22. Although the operation of the foregoing components, with the notable exception of film mode detection circuit 14, is well known to those of ordinary skill in the art, a brief description thereof is nevertheless provided herein for the sake of completeness.

Specifically, pre-processing circuit 12 receives video data for video sequence 7 from telecine device 2. This data may be received over a variety of media, such as a local area network ("LAN"), the Internet, or the like. Pre-processing circuit 12 performs a variety of types of signal processing on the received video data so as to reduce noise therein and to correct for errors that may have been introduced into the data during transmission. To this end, pre-processing circuit 12 may perform low-pass or other types of filtering on the video data. Additionally, pre-processing circuit 12 may perform any necessary conversions on the video data, such as converting the video data from "4:2:2" format to "4:2:0" format.

Following processing by pre-processing circuit 12, processed video data is transmitted to film mode detection circuit 14. As shown in FIG. 2, film mode detection circuit 14 includes processor 27, which may comprise a microprocessor, microcontroller, or the like, and one or more memories 29 which store computer executable process steps. In operation, processor 27 executes the process steps stored in one or more of memories 29 so as to detect redundant images (i.e., fields and/or frames) in a target image in video sequence 7, and so as to output a flag indicating whether coding circuitry 15 should, or should not, code the target image. A detailed description of these aspects of the operation of film mode detection circuit 14 is provided below.

Once film mode detection circuit 14 has processed the video data in the manner described above, the video data is transmitted to coding circuitry 15. Coding circuitry 15 then codes the video data. In this regard, coding circuitry 15 only codes the video data for images which are not redundant. Coding circuitry 15 knows which images to code, and which not to code, based on the flag output from film mode detection circuit 14. For example, an image output with a flag value of "1"; i.e., a redundant image, will not be coded and is thus effectively eliminated from the video data. On the other hand, an image output with a flag value of "0", i.e., a non-redundant image, will be coded. To this end, control circuitry 15 shown in FIG. 2 is configured to code the video data using MPEG2 coding. Accordingly, the following description assumes that the video data is coded using MPEG2 coding; although, as noted above, other coding methods may be used in the invention.

Block conversion circuit 16 makes the determination, described above, as to which images to code and which not to code. For images that are to be coded, block conversion circuit 16 converts raster lines of the video data into macroblocks (i.e., 16×16 pixel blocks), and then into individual 8×8 pixel blocks. Thereafter, DCT circuit 17 subjects these individual 8×8 pixel blocks to a DCT so as to generate DCT coefficients for each of the 64 pixels therein in accordance with a quantization step size. DCT circuit 17 then divides DCT coefficients in the 8×8 pixel block by a corresponding quantization weight. Thereafter, the output from DCT circuit 17 is provided to VLC circuit 19, which performs variable-length coding on the DCT coefficients and outputs the variable-length coded bits to rate buffer 20. Rate buffer 20 takes this variable-length bitstream and buffers it so that bits are output from encoder 4 at a substantially constant rate.

In this regard, DCT circuit 17 performs the functions described above based on an amount of memory that is available in rate buffer 20. That is, rate controller 21 selects a quantization step size for DCT circuit 17 based, in part, on an amount of available space in rate buffer 20. By doing this, rate controller 21 is able to ensure that the bitstream output from rate buffer 20 is output at a substantially constant rate. As shown in FIG. 2, rate controller 21 also takes into account information from macroblock complexity analyzer 22 in making the determination of the quantization step size. In this regard, macroblock complexity analyzer 22 determines the complexity, e.g., the number of bits, of each macroblock, and then provides this information to rate controller 21. This information is then used, together with information relating to the amount of available space in rate buffer 20, to determine the quantization step size used by DCT circuit 17.

At this point, it is noted that the present invention may be implemented using encoders having a variety of different architectures, and that the invention is not limited to implementation with the encoder architecture shown in FIG. 2. In this regard, another example of an encoder architecture in which the invention may be implemented is described in U.S. patent application Ser. No. 09/016,038, entitled "System For Extracting Coding Parameters From Video Data" (Assignee: Philips Electronics North America Corporation; Assignee Reference No.: 15-700011; Inventors: Yingwei Chen and Kiran Challapali), the contents of which are hereby incorporated by reference into the subject application as if set forth herein in full. Specifically, the present invention may be implemented in the redundant field/frame detection circuit of the encoder described in U.S. patent application Ser. No. 09/016,038.

Figure 3:
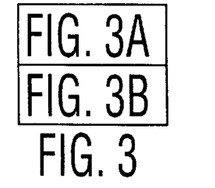
FIG. 3 comprised of FIGS. 3A and 3B, is a flow diagram showing a coding process in accordance with the present invention.
Figure 3A:
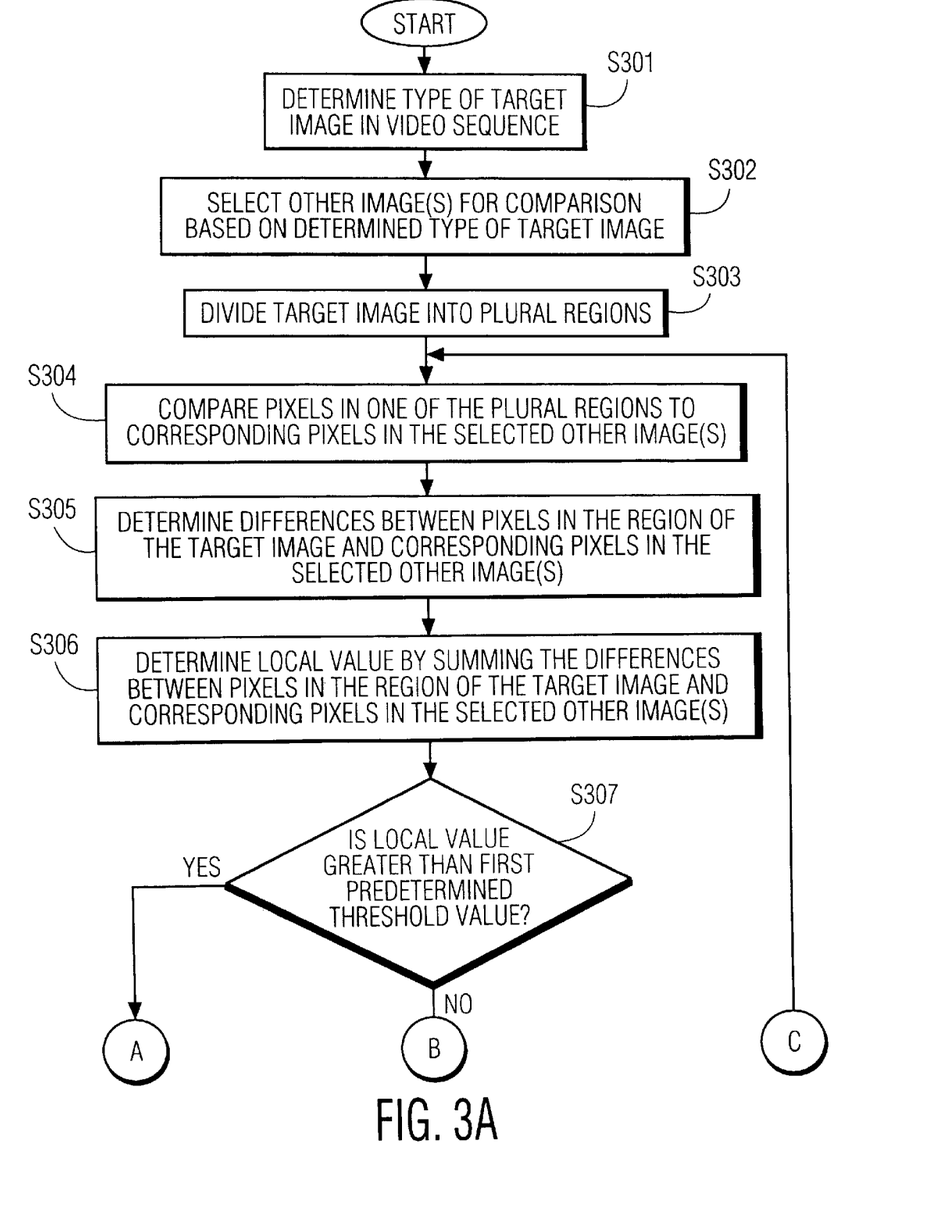
Figure 3B:
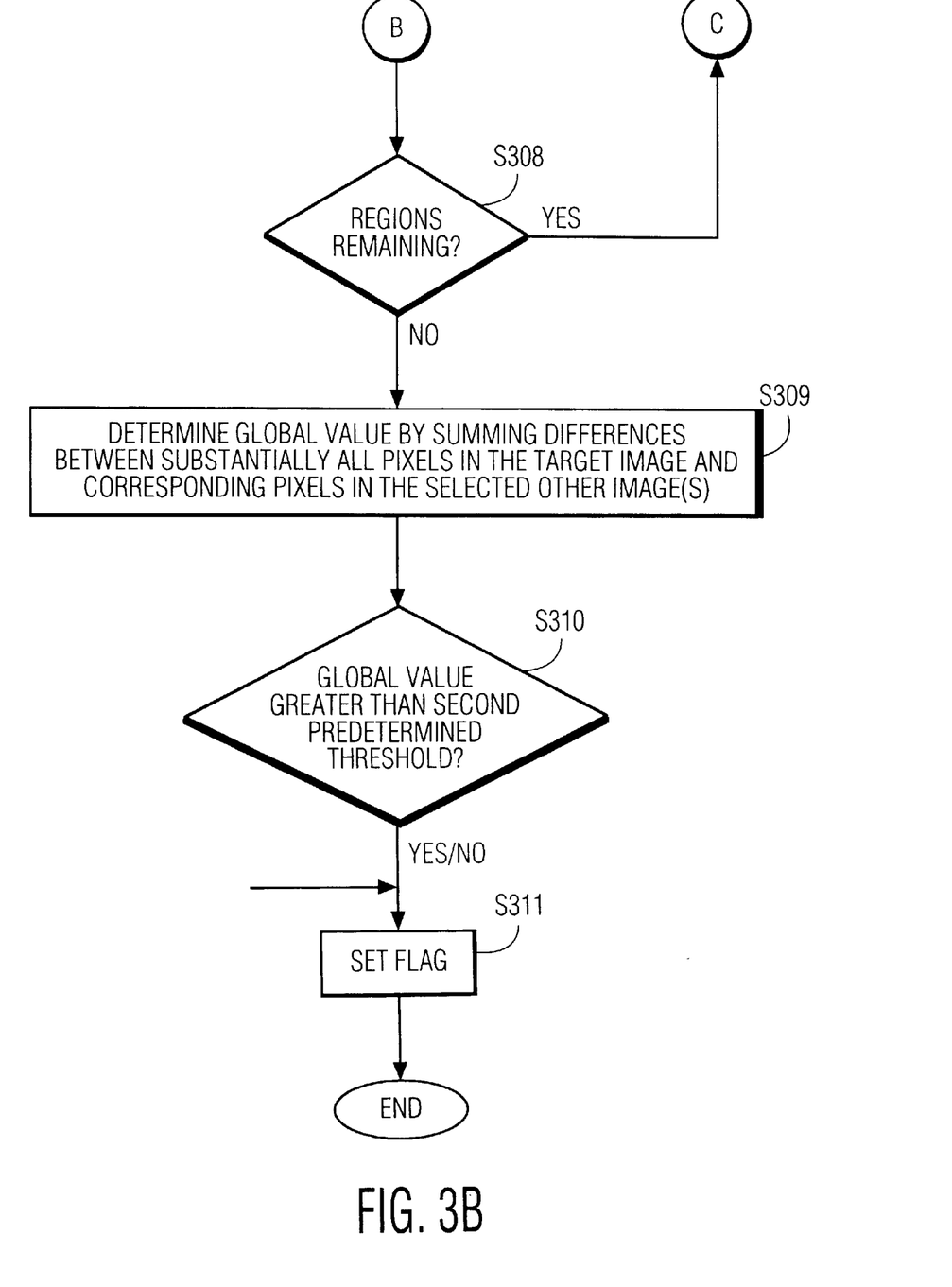

FIG. 3 is a flow diagram showing, in detail, the process steps for detecting a redundant image which are executed by processor 27 in film mode detection circuit 14. To begin, step S301 determines a "type" of a target image in video sequence 7. For example, step S301 determines whether the target image comprises interlaced video having a frame rate of 30 frames-per-second or progressive video having a frame rate of 60 frames-per-second. Thereafter, step S302 selects one or more other images in video sequence 7 based on the type of the target image determined in step S302. That is, in the case that the target image comprises interlaced video having a frame rate of 30 frames-per-second, step S302 selects one field in a frame of the video sequence that immediately precedes the target image. In particular, step S302 selects a field that has a same polarity as the target image.

As background, interlaced video is comprised of plural frames, each of which has two fields. These fields are arranged in the frame such that, e.g., a first field occupies lines 1, 3, 5, 7 . . . of the frame, and such that a second field occupies lines 2, 4, 6, 8 . . . of the frame. The polarity noted above refers to which set of lines that the field in question occupies. Thus, in a case that video sequence 7 comprises interlaced video, the target image is one field in a frame of the video sequence, and the other image selected in step S302 is a field in an immediately preceding frame that has the same polarity as the target image. Moreover, in the case that video sequence 7 comprises interlaced video, step S302 selects only one field due to the relatively small difference in the number of frames between interlaced video (i.e., 30 frames-per-second) and film (i.e., 24 frames-per-second). That is, in this case during conversion from film to video, telecine device 2 does not repeat the same frame more than twice. Accordingly, in detecting redundancy, it is only necessary to look at two frames at a time. This is not the case for progressive video, as described below.

In this regard, in a case that step S301 determines that the target image comprises progressive video having a frame rate of 60 frames-per-second, step S302 selects two frames that immediately precede the target image in video sequence 7. That is, due to the relatively large difference between frame rates of progressive video (60 frames-per-second) and film (24 frames-per-second), during generation of video sequence 7, telecine device 2 will repeat some frames twice, and other frames three times. Thus, in progressive video, the same frame may appear three times. As a result, there is the possibility of having two consecutive redundant images in video sequence 7. To address this contingency, in the case that the target image is progressive video, step S302 selects the two frames that immediately precede the target image.

Figure 4:
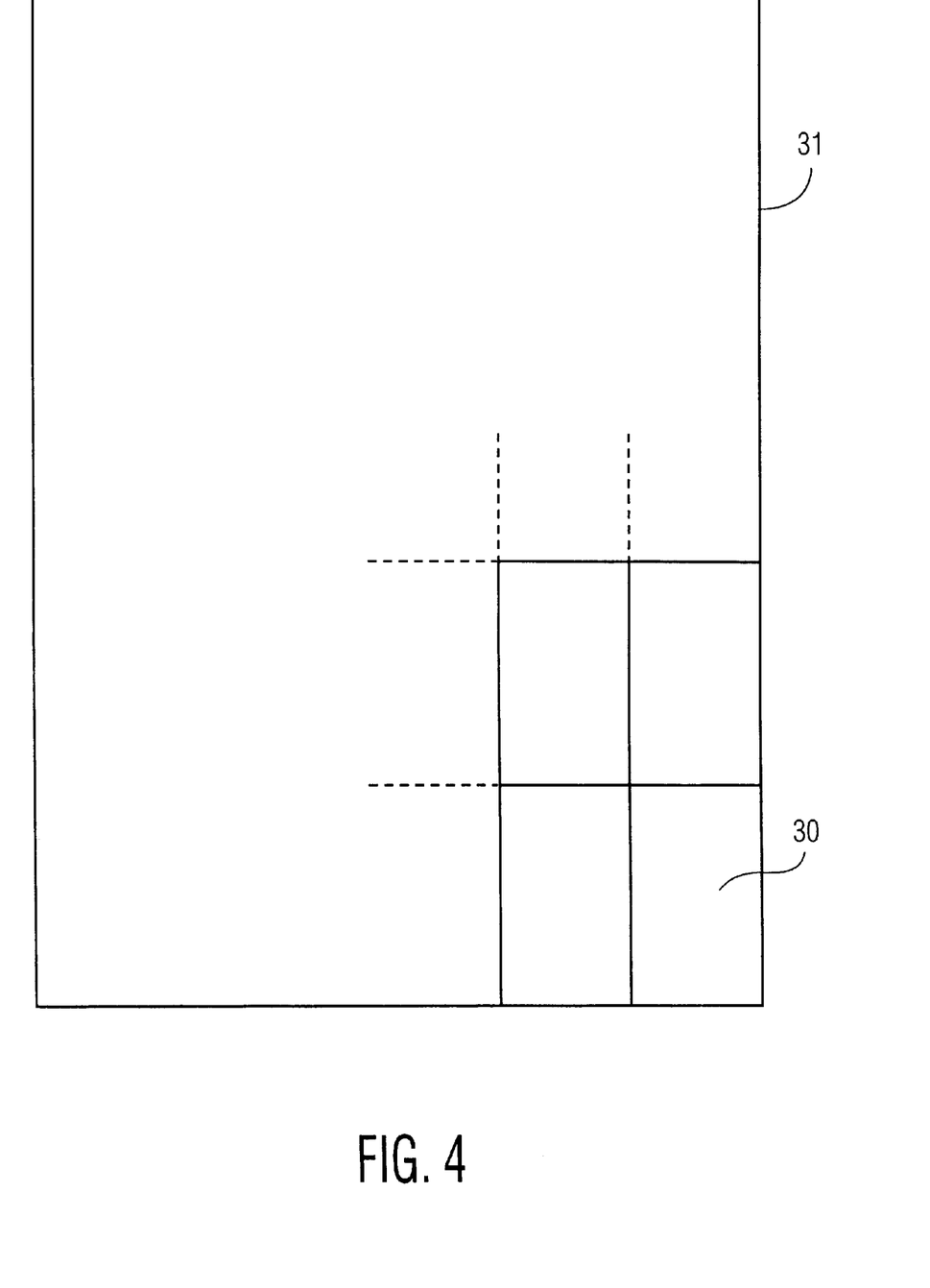
FIG. 4 shows an image broken down into regions in accordance with the present invention.

Following step S302, processing proceeds to step S303. Step S303 divides the target image into plural, i.e., N (N>1), regions, each of which has substantially contiguous pixels. An example of such a region 30 in target image 31 is shown in FIG. 4. In preferred embodiments of the invention, N has a value of 50, meaning that the target image is divided into 50 regions. It should be noted, however, that any number of regions may be used in the practice of the present invention.

After the target image has been divided into regions by step S303, step S304 compares pixels in one of these regions to corresponding pixels in the one or more images selected in step S302. In this regard, for the sake of clarity and simplicity, the following description relates to interlaced video, in which only one immediately preceding field is selected. It is noted, however, that the following steps of the invention are virtually identical for progressive video, with the main difference being that each of the steps must be performed twice, i.e., once for each of the two frames of progressive video selected in step S302.

Thus, step S304 compares pixels in a first region of the target image to corresponding pixels in the other image selected in step S302. In the case of interlaced video, this comparison is, of course, between pixels having the same polarity. Step S305 then determines differences between pixels in the region of the target image and corresponding pixels in the other image selected in step S302. For example, step S305 compares binary data values of these pixels, and determines the differences between these binary data values.

Thereafter, step S306 determines a local value for the region of the target pixel by summing the differences between pixels in the region and corresponding pixels in the other image selected in step S302. Step S307 then compares the local value determined in step S306 to a first predetermined threshold value, $T_1$. In this regard, the first predetermined threshold value is preferably based on differences in content between the target image and the other image and, in preferred embodiments of the invention has a value of 2.0 dB. However, it is noted that the first predetermined threshold value may take other factors into account, and may have any number of different values depending upon the circumstances.

In a case that step S307 determines that the local value for the region is greater than the first predetermined threshold value, this means that there are significant differences between the target image and the other image selected in step S302 and, therefore, that the target image is not a redundant image. Accordingly, processing proceeds to step S311, which sets a flag to indicate that the target image is not a redundant image, and which outputs the flag along with the video data for the target image. On the other hand, in a case that step S307 determines that the local value for the region is not greater than the first predetermined threshold value, processing proceeds to step S308, which determines if there are regions remaining within the target image that have yet to be examined. In a case that step S308 determines that there are regions left to be examined, processing returns to step S304. On the other hand, in a case that step S308 determines that there are no regions left Lo be examined within the target image, processing proceeds to step S309. Thus, at this point, significant "local" differences between the target image and the other image selected in step S302 have not yet been identified, meaning that the target image is potentially a redundant image (i.e., a redundant field or frame). To confirm this, the "global" processing described below must be performed.

More specifically, step S309 comprises determining a global value for the target image by summing the differences between substantially all pixels in the target image and corresponding pixels in the other image selected in step S302. Step S310 then compares this global value to a second predetermined threshold value, $T_2$. In this regard, the second predetermined threshold value is preferably based on differences in noise between the target image and the other image and, in preferred embodiments of the invention has a value of 1.5 dB. However, it is noted that the second predetermined threshold value may take other factors into account as well, such as noise introduced during signal transmission or the like. Moreover, the second predetermined threshold value may have other values, depending upon the circumstances.

In a case that step S310 determines that the global value is greater than the second predetermined threshold value, this means that there are sufficient differences between the target image and the image selected in step S302 and, therefore, that the target image is not a redundant image. On the other hand, in a case that step S310 determines that the global value is less than the second predetermined threshold value, the invention concludes that the target image is a redundant image. In either case, processing proceeds to step S311.

Step S311 sets one or more flags in the video sequence, which indicate whether the target image is a redundant image, e.g., a "1" indicates a redundant image and a "0" indicates a non-redundant image, and outputs these flags along with video data for the video sequence. As described above, encoder 4 and decoder 5 read these flags and perform appropriate processing in response thereto. In encoder 4, this processing comprises determining whether or not to code the target image. In decoder 5, this processing, in most instances, comprises repeating, in the decoded data, an image corresponding to the flag. In this regard, for interlaced video, the repeat$_{13}$ first$_{13}$ field flag in the MPEG2 syntax is used to indicate to decoder 5 that decoder 5 should recreate the deleted field by repeating the field corresponding the repeat$_{13}$ first$_{13}$ field flag. For progressive video, since there can potentially be two consecutive frames that are redundant, the repeat_first$_{13}$ field flag and the top_field$_{13}$ first flag in the MPEG2 syntax can be used to indicate to decoder 5 that decoder 5 should recreate deleted frame(s) by repeating the frame(s) corresponding to the repeat$_{13}$ first$_{13}$ field flag and/or the top_field_first flag. Once flags such as the foregoing have been set in the video data, processing ends. Thereafter, the video data is output from film detection circuit 14 to coding circuitry 15 for processing in the manner described above.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

What is claimed is:

1. An apparatus which detects redundant images in a video sequence, the apparatus comprising:
    a memory which stores computer executable process steps; and
    a processor which executes the process steps stored in the memory so as (i) to divide a target image in the video sequence into a plurality of regions, (ii) to determine, for each of the plurality of regions, a local value comprising a sum of differences between individual pixels of each region and corresponding pixels in at least one other image in the video sequence, (iii) to compare the local value for each of the plurality of regions to a first predetermined threshold, (iv) to determine a global value comprising a sum of differences between substantially all pixels in the target image and corresponding pixels in the at least one other image, (v) to compare the global value to a second predetermined threshold, and (vi) to indicate that the target image is redundant in a case that (a) the local value does not exceed the first predetermined threshold for all regions, and (b) the global value does not exceed the second predetermined threshold.

2. An apparatus according to claim 1, wherein the processor further determines a type of video image comprising the video sequence and selects the at least one other image in accordance with the determined type of the video image.

3. An apparatus according to claim 2, wherein, in a case that the processor determines that the type of the video image is 30 frames-per-second interlaced video, the at least one other image comprises a field of the video sequence that immediately precedes the target image.

4. An apparatus according to claim 3, wherein the target image comprises a field of the video sequence; and
    wherein the field of the video sequence that immediately precedes the target image has a same polarity as the field comprising the target image.

5. An apparatus according to claim 2, wherein, in a case that the processor determines that the type of the video image is 60 frames-per-second progressive video, the at least one other image comprises two frames of the video sequence that immediately precede the target image.

6. An apparatus according to claim 1, wherein the processor indicates that the target image is a redundant image by setting at least one flag in video data for the video sequence.

7. An apparatus according to claim 1, wherein the first threshold is set based on differences in content between the target image and the at least one other image; and
    wherein the second threshold is set based on noise introduced into video data for the target image by a device used to generate the video sequence.

8. An apparatus according to claim 1, wherein the processor divides the target image into 50 regions, the first threshold is 2.0 dB and the second threshold is 1.5 dB.

9. A method which of detecting redundant images in a video sequence, the method comprising the steps of:
    dividing a target image in the video sequence into a plurality of regions;
    determining, for each of the plurality of regions, a local value comprising a sum of differences between individual pixels of each region and corresponding pixels in at least one other image in the video sequence;
    comparing the local value for each of the plurality of regions to a first predetermined threshold;
    determining a global value comprising a sum of differences between substantially all pixels in the target image and corresponding pixels in the at least one other image;
    comparing the global value to a second predetermined threshold; and
    indicating that the target image is redundant in a case that (i) the local value does not exceed the first predetermined threshold for all regions, and (ii) the global value does not exceed the second predetermined threshold.

10. A method according to claim 9, further comprising the steps of:
    determining a type of video image comprising the video sequence; and
    selecting the at least one other image in accordance with the determined type of the video image.

11. A method according to claim 10, wherein, in a case that the type of the video image is 30 frames-per-second interlaced video, the at least one other image comprises a field of the video sequence that immediately precedes the target image.

12. A method according to claim 11, wherein the target image comprises a field of the video sequence; and
    wherein the field of the video sequence that immediately precedes the target image has a same polarity as the field comprising the target image.

13. A method according to claim 10, wherein, in a case that the type of the video image is 60 frames-per-second progressive video, the at least one other image comprises two frames of the video sequence that immediately precede the target image.

14. A method according to claim 9, wherein the indicating step indicates that the target image is a redundant image by setting at least one flag in video data for the video sequence.

15. A method according to claim 9, wherein the first threshold is set based on differences in content between the target image and the at least one other image; and
    wherein the second threshold is set based on noise introduced into video data for the target image by a device used to generate the video sequence.

16. A method according to claim 9, wherein the dividing step divides the target image into 50 regions, the first threshold is 2.0 dB and the second threshold is 1.5 dB.

17. An encoding device for encoding video data in a video sequence which includes a target image and at least one other image, the encoding device comprising:

a film mode detection circuit which determines whether the target image is a redundant image by comparing two threshold values to sums of differences between pixels in the target image and corresponding pixels in the at least one other image, where a first of the threshold values is set based on differences in content between the target image and the at least one other image, and where a second of the threshold values is set based on noise introduced into the video sequence by a device used to generate the video sequence; and coding circuitry which codes video data for the target image in a case that the film mode detection circuit determines that the target image is not redundant.

18. An encoding device according to claim 17, wherein, in a case that the film mode detection circuit determines that the target image is a redundant image, the film mode detection circuit outputs a flag with video data for the video sequence.

19. An encoding device according to claim 18, wherein the flag comprises an indication to a decoder that the at least one other image is to be repeated.

20. An encoding device according to claim 17, wherein the film mode detection circuit comprises:

a memory which stores computer-executable process steps; and a processor which executes the process steps stored in the memory so as (i) to divide the target image into a plurality of regions, (ii) to determine, for each of the plurality of regions, a local value comprising a sum of differences between individual pixels of each region and corresponding pixels in the at least one other image in the video sequence, (iii) to compare the local value for each of the plurality of regions to the first threshold value, (iv) to determine a global value comprising a sum of differences between substantially all pixels in the target image and corresponding pixels in the at least one other image, (v) to compare the global value to the second threshold value, and (vi) to output an indication to the coding circuitry that the target image is redundant in a case that (a) the local value does not exceed the first threshold value for all regions, and (b) the global value does not exceed the second threshold value.

21. A system for transmitting a video sequence comprised of a target image and at least one other image, the system comprising:

a telecine device which generates and outputs video data for the video sequence based on input film images;

an encoder which codes the video data prior to transmission, the encoder comprising:

a film mode detection circuit which determines whether the target image is a redundant image by comparing two threshold values to sums of differences between pixels in the target image and corresponding pixels in the at least one other image, wherein a first of the threshold values is set based on contents of the target image and the at least one other image, and a second of the threshold values is set based on the telecine device; and coding circuitry which codes the video data for the target image in a case that the film mode detection circuit determines that the target image is not redundant; and a decoder which receives coded video data from the encoder and which decodes the video data.

22. A system according to claim 21, wherein the film mode detection circuit comprises:

a memory which stores computer-executable process steps; and a processor which executes the process steps stored in the memory so as (i) to divide the target image into a plurality of regions, (ii) to determine, for each of the plurality of regions, a local value comprising a sum of differences between individual pixels of each region and corresponding pixels in the at least one other image in the video sequence, (iii) to compare the local value for each of the plurality of regions to the first threshold value, (iv) to determine a global value comprising a sum of differences between substantially all pixels in the target image and corresponding pixels in the at least one other image, (v) to compare the global value to the second threshold value, and (vi) to output an indication to the coding circuitry that the target image is redundant in a case that (a) the local value does not exceed the first threshold value for all regions, and (b) the global value does not exceed the second threshold value.

23. A system according to claim 22, wherein, in a case that the film mode detection circuit determines that the target image is redundant, the film mode detection circuit outputs a flag with the video data for the video sequence; and wherein, when the decoder encounters the flag in the video data, the decoder decodes the coded video data by repeating the at least one other image.

* * * * *